(12) United States Patent
Kannan et al.

(10) Patent No.: US 11,423,344 B2
(45) Date of Patent: Aug. 23, 2022

(54) COMPUTERIZED PROMOTION AND MARKDOWN PRICE SCHEDULING

(71) Applicant: ORACLE INTERNATIONAL CORPORATION, Redwood Shores, CA (US)

(72) Inventors: Aswin Kannan, Chennai (IN); Kiran Panchamgam, Bedford, MA (US); Su-Ming Wu, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/724,725

(22) Filed: Dec. 23, 2019

(65) Prior Publication Data
US 2020/0126016 A1    Apr. 23, 2020

Related U.S. Application Data

(63) Continuation of application No. 14/989,932, filed on Jan. 7, 2016, now Pat. No. 10,528,903.

(51) Int. Cl.
G06Q 30/02    (2012.01)
G06Q 10/06    (2012.01)
G06Q 10/08    (2012.01)

(52) U.S. Cl.
CPC ..... *G06Q 10/06315* (2013.01); *G06Q 10/087* (2013.01); *G06Q 30/0201* (2013.01);
(Continued)

(58) Field of Classification Search
None
See application file for complete search history.

(56) References Cited

U.S. PATENT DOCUMENTS 7,092,896 B2    8/2006    DeLurgio et al.
7,251,615 B2    7/2007    Woo
(Continued)

OTHER PUBLICATIONS

Gupte, A., Ahmed, S., Cheon, M. S., & Dey, S. (2013). Solving mixed integer bilinear problems using MILP formulations. SIAM Journal on Optimization, 23(2), 721-744. (Year: 2013).*

(Continued)

*Primary Examiner* — Alan Torrico-Lopez
(74) *Attorney, Agent, or Firm* — Kraguljac Law Group, LLC

(57) ABSTRACT

Systems, methods, and other embodiments associated with generating a price schedule are described. In one embodiment, for each customer segment of a plurality of customer segments, a per-segment value of an approximate objective function for the customer segment is determined by an optimizer, and a ratio of the per-segment value to a sum of all per-segment values for the customer segments is computed. The inventory quantity is allocated amongst the customer segments according to the ratio for each customer segment to form an inventory quantity for each customer segment. For each customer segment, a promotion portion of the price schedule that maximizes the objective function by the optimizer is determined. A quantity of remaining inventory allocated to the plurality of customer segments at an end of the regular season is aggregated. A markdown portion of the price schedule for the item that maximizes the objective function is determined by the optimizer. The promotion portion and the markdown portion are combined to create the price schedule for the item.

19 Claims, 7 Drawing Sheets

(52) U.S. Cl.
CPC ..... *G06Q 30/0206* (2013.01); *G06Q 30/0223* (2013.01); *G06Q 30/0235* (2013.01); *G06Q 30/0283* (2013.01)

(56) References Cited

U.S. PATENT DOCUMENTS

| | | | |
|---|---|---|---|
| 8,082,175 | B2 | 12/2011 | Rosenberg et al. |
| 8,271,318 | B2 | 9/2012 | Sanli et al. |
| 2003/0220830 | A1 | 11/2003 | Myr |
| 2003/0229502 | A1 | 12/2003 | Woo |
| 2008/0033809 | A1 | 2/2008 | Black et al. |
| 2008/0077459 | A1* | 3/2008 | Desai ............... G06Q 10/06314 705/7.24 |
| 2011/0313840 | A1 | 12/2011 | Mason et al. |
| 2013/0132153 | A1 | 5/2013 | Vakhutinsky et al. |
| 2013/0211877 | A1 | 8/2013 | Kushkuley et al. |
| 2013/0211878 | A1 | 8/2013 | Kushkuley et al. |
| 2014/0200964 | A1 | 7/2014 | Hassanzadeh et al. |
| 2015/0039395 | A1 | 2/2015 | Denslow, III et al. |
| 2015/0081393 | A1 | 3/2015 | Cohen et al. |
| 2015/0317653 | A1* | 11/2015 | Ettl ................... G06Q 30/0202 705/7.31 |
| 2015/0332208 | A1 | 11/2015 | Scott et al. |
| 2016/0189278 | A1* | 6/2016 | Parpia ................ G06Q 30/0635 705/26.81 |

OTHER PUBLICATIONS

Hasan, M.M.F. and Karimi, I. (2010), Piecewise linear relaxation of bilinear programs using bivariate partitioning. AIChE J., 56: 1880-1893. https://doi.org/10.1002/aic.12109 (Year: 2010).*
China National Intellectual Property Association, Notification of First Office Action issued in Chinese Application No. 201780004722.6 entitled "Computerized Promotion and Markdown Price Scheduling", dated Jul. 5, 2021 (8 pgs).

* cited by examiner

COMPUTERIZED PROMOTION AND MARKDOWN PRICE SCHEDULING

CROSS REFERENCE TO RELATED APPLICATIONS

This disclosure is a continuation of and claims the benefit of priority to U.S. patent application Ser. No. 14/989,932 filed Jan. 7, 2016, which is now U.S. Pat. No. 10,528,903, titled "COMPUTERIZED PROMOTION AND MARKDOWN PRICE SCHEDULING", inventors: Aswin Kannan, Kiran Panchamgam, and Su-Ming Wu, assigned to the present assignee, and which is incorporated by reference herein in its entirety.

BACKGROUND

In the retail industry, pricing uniformly over a period of time is quite rare. For apparel and other short-life merchandise, customers respond to price drops and increases with higher and lower demand levels, respectively. Retailers use this consumer behavior and reduce product prices significantly towards the end of the season (also referred to as the clearance period) to sell their inventory completely. Retailers implement price drops in two formats: promotions and markdowns. Promotions are temporary price reductions which typically last a few weeks. Markdowns are permanent reductions in price. Promotions take place in the "regular" season for merchandise while markdowns occur during the "clearance" season. For example, the summer clothing collection may see promotions during the summer months, but if the inventory is high, then the summer collection is marked down towards the end of the summer season or at the beginning of the fall season. A notable feature of the clearance season is that once the price drops from the regular price, it does not rise again in that season.

SUMMARY

In one embodiment, a computer-implemented method to determine a price schedule for an item is presented. For each customer segment of a plurality of customer segments, (i) a per-segment value of an approximate objective function for the customer segment is determined by an optimizer, wherein the per-segment value is determined based at least on an inventory quantity of the item, a set of prices for the item, an approximate per-segment demand model, and an approximate objective function, and (ii) a ratio of the per-segment value to a sum of all per-segment values for the customer segments is computed. The inventory quantity is allocated amongst the customer segments according to the ratio for each customer segment to form an inventory quantity for each customer segment. For each customer segment, a promotion portion of the price schedule that maximizes the objective function is determined by the optimizer, wherein the promotion portion of the price schedule is determined based at least on the set of prices, the inventory quantity for the customer segment, the approximate per-segment demand model, and the approximate objective function to the optimizer. A quantity of remaining inventory allocated to the plurality of customer segments at an end of the regular season is aggregated. A markdown portion of the price schedule for the item that maximizes the objective function is determined by the optimizer, wherein the markdown portion of the price schedule is determined based at least on the set of prices, the aggregated quantity of remaining inventory, an approximate aggregate demand model for the item, and the approximate objective function. The promotion portion and the markdown portion are combined to create the price schedule for the item.

In one embodiment, the price schedule is transmitted over the network to a computing device of a retailer to cause the computing device of the retailer to modify prices of items in a pricing database according to the price schedule.

In one embodiment, for each time period in a set of time periods for a promotion portion of a season, (i) a set of customer segment demands for the item when the item is priced at respective prices in the set of prices is calculated, (ii) a plurality of lines corresponding to a piecewise linear approximation of the set of customer segment demands is calculated, and (iii) for each price in the set of prices, a line that corresponds to a highest demand at the price is selected. The approximate per-segment demand model for the price during the time period is an equation for the selected line for the price during the time period.

In one embodiment, for each time period in a set of time periods for a markdown portion of a season, (i) for each customer segment, a set of customer segment demands for the item when the item is priced at respective prices in the set of prices is calculated, (ii) a set of respective aggregate demands is calculated by aggregating respective customer segment demands for each price, (iii) a plurality of lines corresponding to a piecewise linear approximation of the set of aggregate demands is calculated, and (iv) for each price, a line that corresponds to a highest demand at the price is selected. The approximate aggregate demand model for the price during the time period is an equation for the selected line.

In one embodiment, for each time period in a set of time periods for an entire season, (i) sales for the item at prices in the set of prices are calculated, and (ii) the objective function is divided into a plurality of segments based at least on the calculated sales. For each segment of the objective function, a linear envelope that covers the segment is determined. The approximate objective function is a description the linear envelopes for each segment of the objective function.

In one embodiment, where the optimizer is a mixed integer linear programming solver, one or more approximation constraints are provided to the optimizer to reduce the complexity of generating the price schedule to a feasible level for the mixed integer linear programming solver.

In one embodiment, an additional constraint is submitted to the optimizer during one or more of the determination of the per-segment value, the determination of the promotion portion, and the determination of the markdown portion. The additional constraint is selected from the group consisting of a self no-touch constraint, a cross no-touch constraint, a must-promote set of items constraint, a cannot-promote set of items constraint, and an inter-item constraint.

In one embodiment, a non-transitory computer-readable medium is presented, storing computer-executable instructions that when executed by at least a processor of a computer cause the computer to perform steps of one or more methods described herein.

In one embodiment, a computing system is presented, including a processor, a memory operably connected to the processor; and a non-transitory computer-readable medium operably connected to the processor and memory and storing computer-executable instructions that when executed by at least the processor cause the computing system to perform steps of one or more methods described herein.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Retailers with short-life cycle merchandise, like apparel, use promotions and markdowns to move inventory and maximize profits in a manner that clears the merchandise by the end of the selling system. Determining when to schedule promotions and markdowns and what prices should be assigned to merchandise during promotions and markdowns is a challenging problem for a retailer. In addition, a retailer often has business rules such as a maximum number of items that can be assigned promotion prices at the same time, that constrain the price schedule for each item. Further, different customer segments (e.g., single people, young people, parents, retirees, and so on) respond differently to promotions and markdowns, a fact which should be captured in the price scheduling process. Considering that many retailers have hundreds of different items each season, it can be seen that even a computerized approach to setting a price schedule for the items sold by a retailer can become infeasible.

Systems and methods are described herein that provide computerized promotion and markdown scheduling for a large number of items in an efficient manner. A different promotion schedule is created for different customer segments to leverage knowledge about the buying habits of different types of customers and maximize profits. The promotion portion of the schedule (i.e., regular season) and the markdown portion of the schedule (i.e., clearance season) are both computed at the same time by the systems and methods described herein, allowing a retailer to consider different promotion and markdown approaches.

Figure 1:
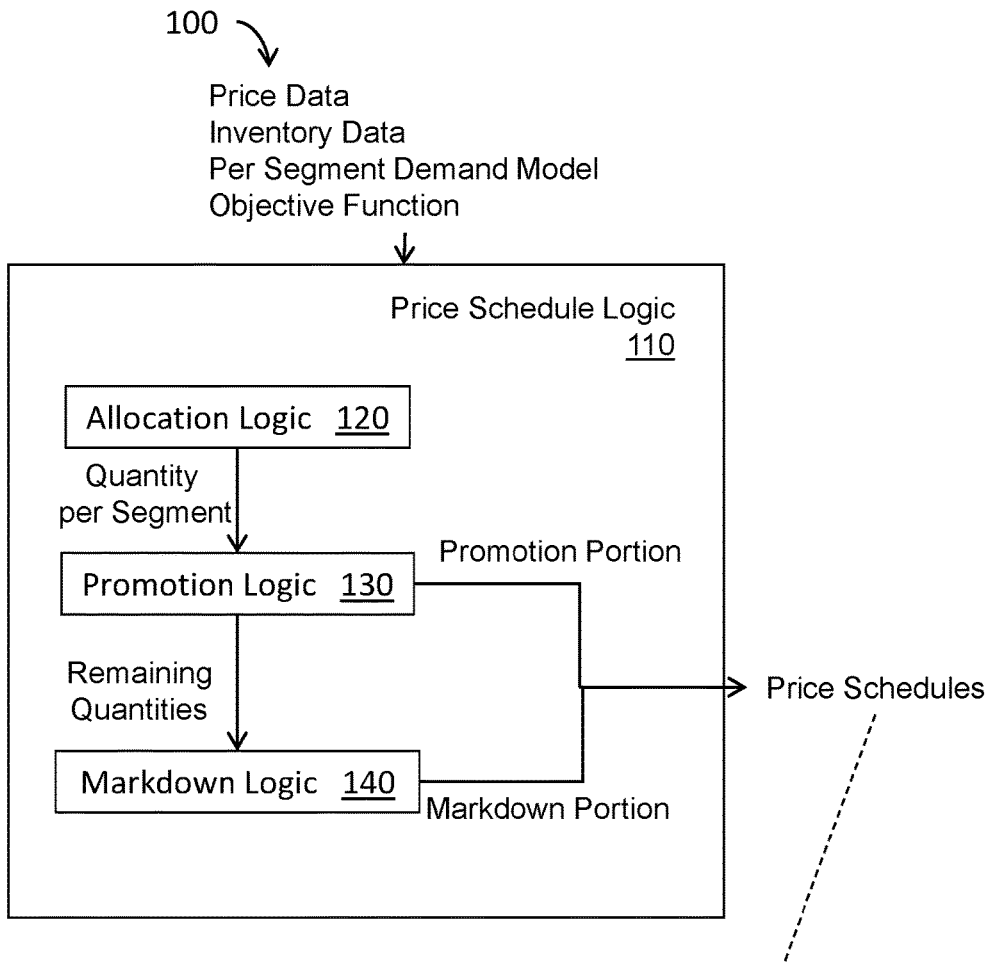
FIG. 1 illustrates one embodiment of a computerized system associated with promotion and markdown price scheduling.

FIG. 1 illustrates one embodiment of a computerized system 100 that generates a price schedule for a set of items. The price schedule is, for example, a data structure stored in memory that contains data values and/or records for information as described herein. The system 100 includes price schedule logic 110 that controls a processor to perform various operations described below (see FIG. 4). In one embodiment, price schedule logic 110 is implemented as computer instructions embodied in a module stored in a non-transitory computer storage medium where the instructions are configured as an executable algorithm configured to perform the functions as described herein when executed by at least the processor of a computing device.

The price schedule logic 110 interacts by way of electronic communication over network or internet connection with a computing device of a retailer. For the purposes of this description, the term "retailer" or "requesting device" is intended to include a computing device under the control of a retailer who prices items for sale and who is requesting, from the system 100, a price schedule for items sold by the retailer. The price schedule logic 110 is configured to receive electronic communications from the remote computing device of the retailer that communicate price data for items, inventory data for the items, a per-segment demand model for the items, and a selected objective function.

The price data defines a set of prices that are to be considered for each item. The set of prices includes the regular price, promotion prices, and markdown prices for the item. In one embodiment, the promotion prices and the markdown prices are separated into two sets, neither of which includes the regular price for the item, to simplify the calculations in the promotion and markdown seasons. Sometimes the set of prices is referred to as the "price ladder" for an item. In one embodiment, cost data for each item is also input by the price schedule logic 110 for use in calculating profits.

Inventory data includes an "inventory quantity" which, for the purposes of this description, includes the initial inventory quantity of an item that will be on hand at the beginning of the regular season and, optionally, scheduled shipments of the item to replenish the stock during the regular season. To input or receive price and inventory data for a set of items, the price schedule logic 110 may query a database that stores such data (e.g., electronic records encoding price ladders and inventory and replenishment quantities).

The per-segment demand model may be provided by the retailer or otherwise accessible to the price schedule logic 110. In one embodiment, the per segment demand model is the scan-pro model. In one embodiment, the per-segment demand model is a stored set of instructions that, when executed by a processor, computes demand for an item based on the price of the item and other factors such as elasticity, promotion fatigue, seasonality, and so on. The per-segment demand model includes different demand parameter values for different customer segments. One example per-segment demand model will be described in detail below, however, it is to be understood that the systems and methods described herein are applicable to any demand model, including demand models that do not differentiate between different customer segments. In one embodiment, the retailer furnishes values for demand parameters based on their own sales histories and experience. In other embodiments, the price schedule logic 110 stores and maintains the per-segment demand model or obtains the per-segment demand model and parameter values from a different source.

The objective function defines the sales-related quantity that the retailer seeks to maximize. Example objective functions include profit and revenue. The revenue objective function will be described in more detail below, however, it is to be understood that the systems and methods described herein are suitable for use with any objective function.

The price logic 110 is configured to generate a price schedule that includes a promotion portion and a markdown portion. The price schedule assigns to the item a series of prices selected from the set of prices for respective time periods (e.g., weeks or days) during a regular season and also a clearance season for the item. A price schedule for an item is generated for each customer segment. Example price schedules for a "singles" customer segment and a "moms" customer segment are shown in FIG. 1. It can be seen that the price schedule is different for the two customer segments during the "regular/promotion" portion of the price schedule, while the price schedule is the same for the two customer segments during the "clearance/markdown" portion of the price schedule. The price schedule logic 110 is configured to transmit, by way of a network connection, the price schedules to the retailer for use in pricing the item.

The promotion and markdown schedule problem increases proportionally when customer segments are taken into account. One of the challenges to performing per-segment promotion and markdown scheduling is that the different customer segments share the same inventory. Another challenge is that the markdown policies are typically the same across all customer segments while per-segment promotion pricing can be achieved by targeted marketing. The price schedule logic 110 includes allocation logic 120, promotion logic 130, and markdown logic 140 that together cooperate to address these challenges using a multi-phase process to generate the promotion and markdown portions of the price schedule.

The allocation logic 120 is configured to allocate the inventory quantity (e.g., initial inventory and, optionally, replenishment quantities) amongst a plurality of customer segments based at least on a predicted contribution of each customer segment to the objective function. By allocating the inventory to each customer segment prior to performing the promotion price determination for each customer segment, the link between the customer segments is broken, greatly simplifying the process of generating the promotion portion and the markdown portion of the price schedule.

For example, a purse may be sold to three different customer segments: single women, mothers, and retirees. The per-segment demand model specifies the particular behaviors of these different types of customers by including different demand parameter values for each segment. The allocation logic 120 is configured to predict a contribution each customer segment to the objective function. In one embodiment, based on the per-segment demand model, the allocation logic 120 may determine that i) when all the inventory quantity is allocated to the single women segment, $1200.00 in revenue (i.e., objective function) will be generated; ii) when all of the inventory quantity is allocated to mothers, $1000.00 in revenue will be generated, and iii) when all of the inventory quantity is allocated to retirees, $300.00 in revenue will be generated. The allocation logic 120 allocates the inventory quantity to the different customer segments based on this predicted contribution (e.g., 1200/(1200+1000+300) or 48% of the inventory quantity is allocated to the single women customer segment, and so on). In other embodiments, other methods of predicting the contribution of each customer segment to the objective function are used.

The promotion logic 130 is configured to determine the promotion portion of the price schedule. For each customer segment, based the quantity of inventory allocated to the customer segment, the promotion logic 130 is configured to determine the promotion portion of the price schedule that maximizes the objective function. The promotion portion assigns to the item a series of prices selected from the set of prices for respective time periods during the regular season for the item.

The markdown logic 140 is configured to aggregate a quantity of remaining inventory in each customer segment at the end of the regular season. The markdown logic 140 is configured to, based at least on the aggregated inventory, determine a markdown portion of the price schedule for the item that maximizes the objective function. The markdown portion assigns a series of prices selected from the set of prices to the item for respective time periods during the clearance season for the item. The price logic 110 combines the promotion portion and the markdown portion for each customer segment to create the price schedule for the customer segment.

In one embodiment, the system 100 is a computing/data processing system including an application or collection of distributed applications for enterprise organizations. The applications and computing system 100 may be configured to operate with or be implemented as a cloud-based networking system, a "software as a service" (SaaS) architecture, or other type of networked computing solution. In one embodiment the price schedule logic 110 is a centralized server-side application that provides at least the functions disclosed herein and that is accessed by many users via computing devices/terminals communicating with the computing system 100 (functioning as the server) over a computer network.

Figure 2A:
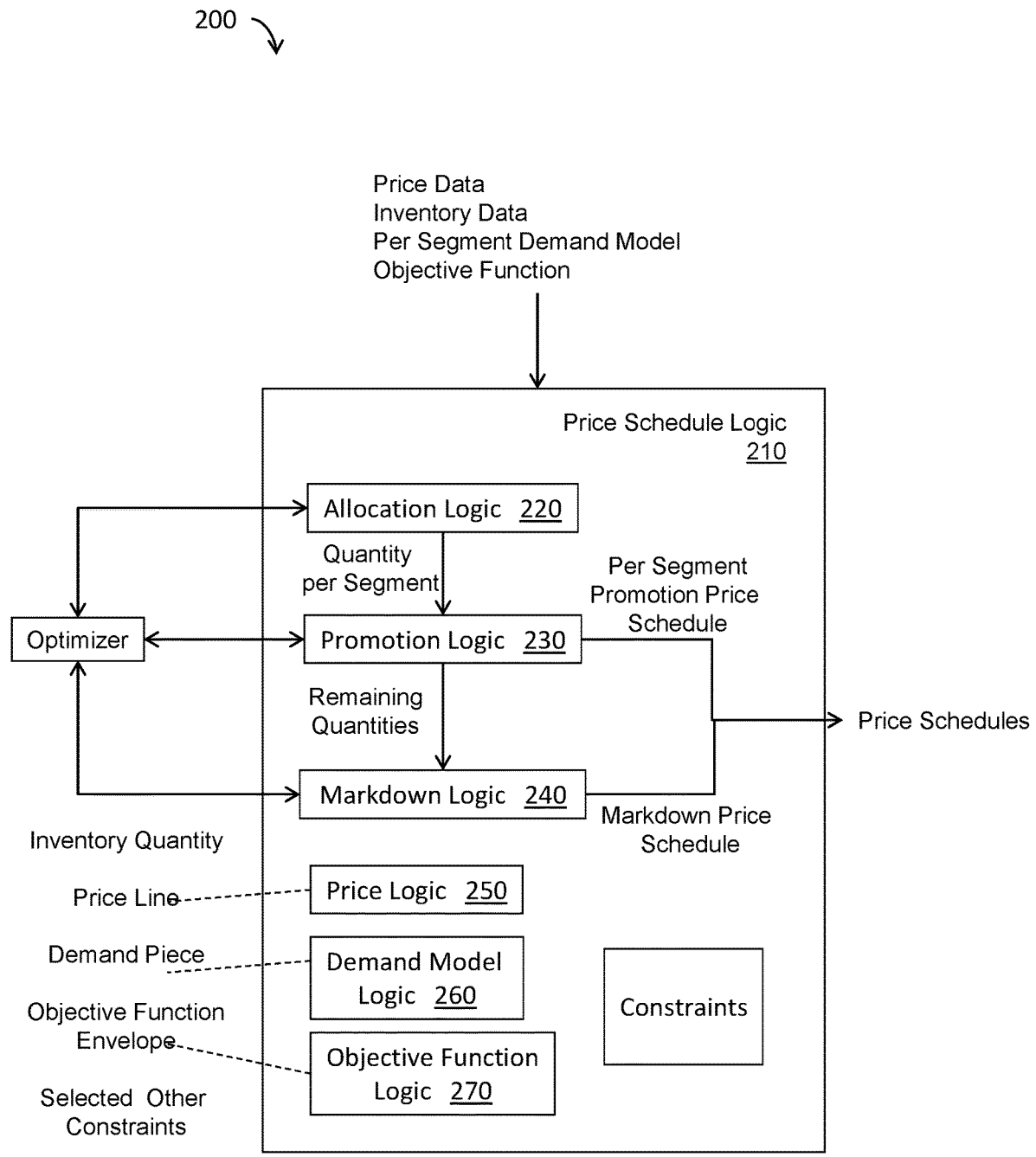
FIGS. 2A-2D illustrate another embodiment of a computerized system associated with promotion and markdown price scheduling.

FIG. 2A illustrates one embodiment of a computerized system 200 that generates a price schedule for a set of items. The system 200 includes price schedule logic 210 with an allocation logic 220, a promotion logic 230, and a markdown logic 240 that function in a manner analogous to that described for the allocation logic 120, the promotion logic 130, and the markdown logic 140. The price logic 210 is configured to interact with an optimizer (e.g., a mixed integer linear programming (MILP) solver such as Gurobi) to generate the price schedule. A number of constraints that constrain various aspects of the price schedule according to business rules and other constraints generated by the price schedule logic 210 as described below are stored by the price schedule logic 210. Mathematical notations describing many example constraints are included in appendix A. These constraints will be referred to by a constraint number assigned to the constraint in the appendix.

Recall that the complexity of generating a price schedule using a per-segment demand model quickly becomes infeasible as the number of items increase. Computerized approaches to this approach using a MILP-based optimizer are unable to generate a price schedule using a per segment demand model accurately in a reasonable time. To make a solution using an MILP based optimizer feasible, the price schedule logic 210 includes a price logic 250, a demand model logic 260, and an objective function logic 270 that make simplifications to the price data, the per segment demand model, and the objective function, respectively, that are provided to the optimizer in the form of approximation constraints. This allows a computing system to generate a more accurate price schedule based on an optimizer more efficiently. Thus, it is at least the practical application of the systems and methods described herein for simplifying the price data, the per segment demand model, and the objective function that enable improvement in accuracy and efficiency of the computing system when generating a price schedule.

The price logic 250 is configured to generate a price line constraint that approximates the set of prices in a manner that allows the prices to be expressed as an integer variable. The demand logic 260 is configured to generate two or more linear demand pieces that approximate the demand function for a customer segment and to provide a selected one of the pieces as a demand piece constraint for each price value. The objective function logic 270 is configured to generate two or more linear envelopes that surround segments of the objective function and to provide a selected one of the envelopes as a set of linear envelope constraints associated with each price value.

The allocation logic 220, the promotion logic 230, and the markdown logic 240 are configured to provide the approximation constraints along with selected other constraints to the optimizer in a manner that will be described in more detail below, after the approximation constraints are explained in detail.

Figure 2B:
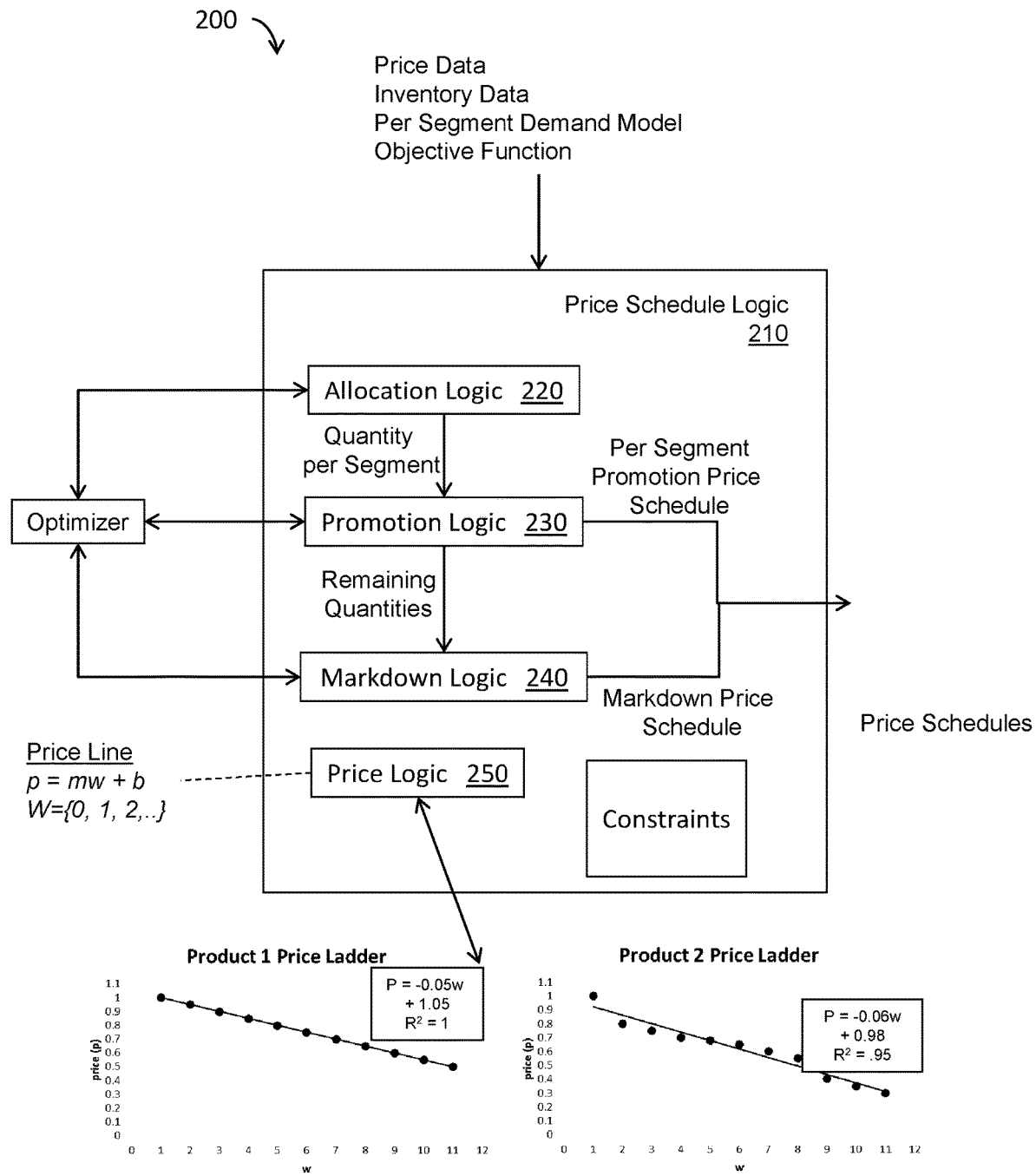

FIG. 2B illustrates how one embodiment of the price logic 250 generates the price line constraint that is used to approximate the set of prices for an item. Using the price line constraint recognizes that optimization problems with integer variables over a finite interval are typically simpler to handle than problems that include a "scaled" number of binary variables accounting for the same interval. If the prices in the set or prices or "price ladder" for an item are regularly spaced, the price ladder can be represented by a scaled integer variable. This feature is used to approximate the price ladder by a line given by position variable w, which is an integer. Prices in the line correspond to different values of w. In general, price ladders are discrete and not necessarily evenly spaced. However, the price line approximation produces acceptable results even when this is the case. Post optimization, a "true" price value from the price ladder that corresponds to the position variable w selected by the optimizer can be included in the price schedule and any other calculations.

To determine the line for a given price ladder, ordinary least squares (OLS) regression is performed on the prices, where each price, taken in order, is assigned a next value of w as shown in FIG. 2B. The price line constraint, also included as constraint C1 in the appendix can expressed mathematically as:

$$p_i^{t,seg} = \hat{\alpha}_i^{t,seg} - \hat{\beta}_i^{t,seg} w_i^{t,seg} \text{ where } w_i^{t,seg} = \{0,1,2,3 \ldots L_i\}$$

EQ 1

In equation 1, $p_i^{t,seg}$ is the price for item "i" in customer segment "seg" at time "t". To determine $\hat{\alpha}_i^{t,seg}$ and $\hat{\beta}_i^{t,seg}$, the OLS regression is performed for each product, customer segment, and time period during the regular season. During the clearance season, the OLS regression is performed for each product and time period. If the price ladder for an item is the same for all customer segments, and/or all time periods the number of OLS regressions is reduced accordingly. FIG. 2B shows two price ladders for two different products. The prices in the first price ladder are equally spaced and exactly define a line. The equation for that line can be seen to be p=−0.05 w+1.05. Likewise, the equation for the price line for the second price ladder can be seen to be p=−0.06 w+0.98. The price line for the item is provided to the optimizer by the allocation logic 120, the promotion logic 130, and the markdown logic 140. This unconventional combination of the optimizer with the input of the price line described here is practically applied in a computing system to more rapidly complete optimization for the allocation logic 120, the promotion logic 130, and the markdown logic 140 when generating a price schedule.

Figure 2C:
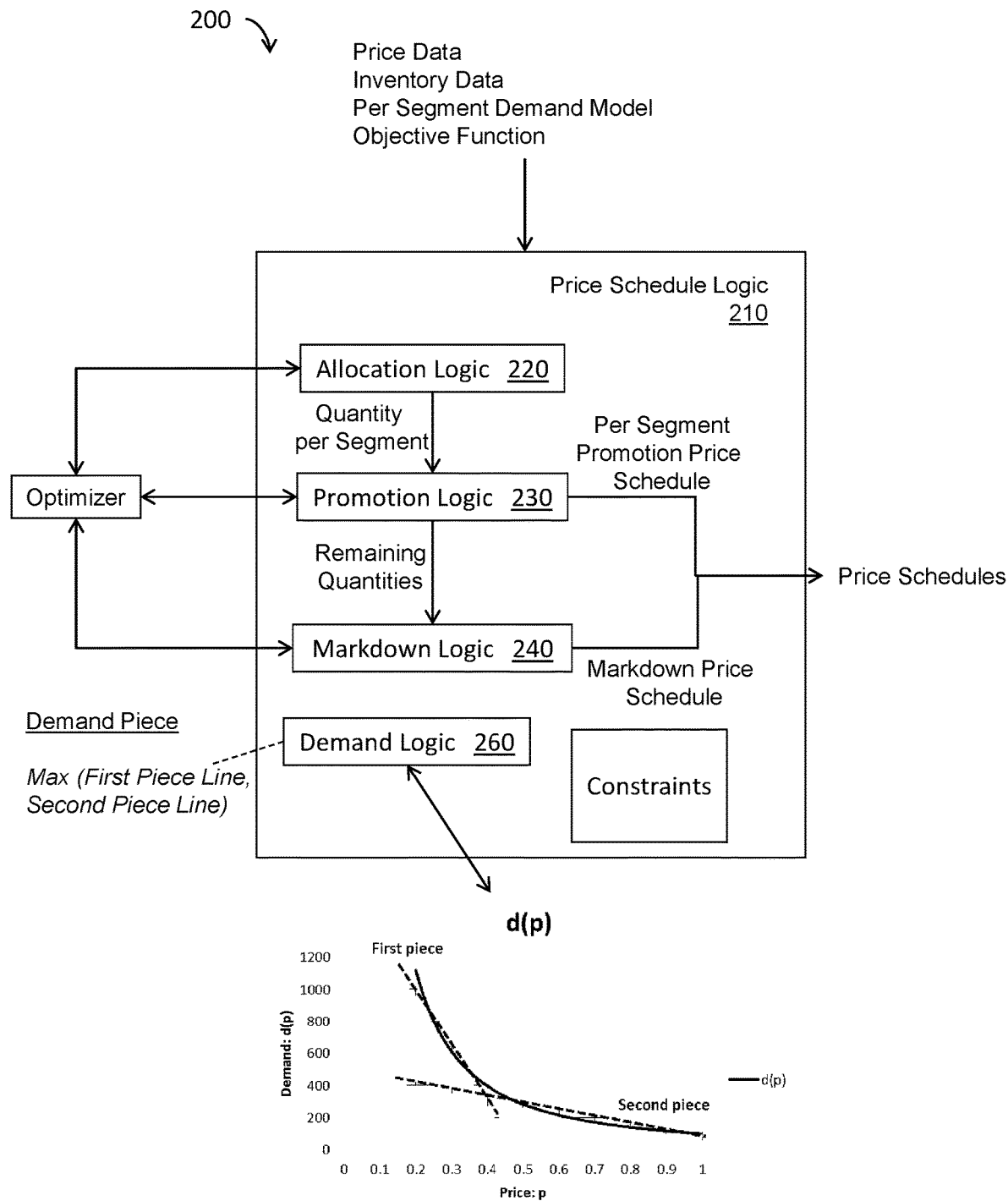

FIG. 2C illustrates how one embodiment of the demand logic 260 determines the demand piece constraint that is a linear approximation of the per-segment demand model provided to the optimizer. In one embodiment, the demand logic 260 is configured to approximate the per-segment demand model over two linear pieces. A mathematical expression of one approximate demand model that includes two linear pieces is:

$$d_i^{t,seg}(p_i^{t,seg}) \approx B_i^{t,seg} * SEA_i^{t,seg} * \max(\overline{m}_i^{t,seg} p_i^{t,seg} + \overline{c}_i^{t,seg}, \hat{m}_i^{t,seg} p_i^{t,seg} + \hat{c}_i^{t,seg})$$

EQ. 2

In equation 2, $d_i^{t,seg}$ is the demand for item "i" in customer segment "seg" at time "t", $B_i^{t,seg}$ is the base demand for item "i" in customer segment "seg" at time "t", $SEA_i^{t,seg}$ is the base seasonality of item "i" in customer segment "seg" at time "t", $\overline{m}_i^{t,seg}$ and $\hat{m}_i^{t,seg}$ are the slope of the first demand piece and second demand piece, respectively, of item "i" in customer segment "seg" at time "t", and $\overline{c}_i^{t,seg}$ and $\hat{c}_i^{seg}$ are the y intercept of the first demand piece and second demand piece, respectively, of item "i" in customer segment "seg" at time "t".

To determine the slope and y intercepts of the first and second demand pieces in the regular season, OLS regression is run on demand values as determined given the different prices in the price ladder for each product, customer segment, and time period in the regular season. The resulting demand pieces are per-segment demand pieces used to generate promotion prices.

During the clearance season, the demand values for the different segments are aggregated in each time period and the OLS regression of the aggregated demand is performed for each product and time period. The resulting demand pieces are aggregate demand pieces used to generate markdown prices.

Mathematically, for any given price point, the demand logic 260 selects the demand piece constraint that yields the higher demand. This is why equation 2 includes the "max" function. Constraint C8 describes, mathematically, one embodiment of the demand piece constraint.

In one embodiment, the demand logic 260 is configured to approximate the demand model over more than two pieces. The demand logic 260 is configured to determine an error in fit when two pieces are used and if the error is above a threshold, "break" the demand model at the point of highest error and re-calculate three linear pieces. This process is repeated until the error becomes small enough. The demand model logic 260 then selects the piece that yields the highest demand at each price point as described above.

Figure 2D:
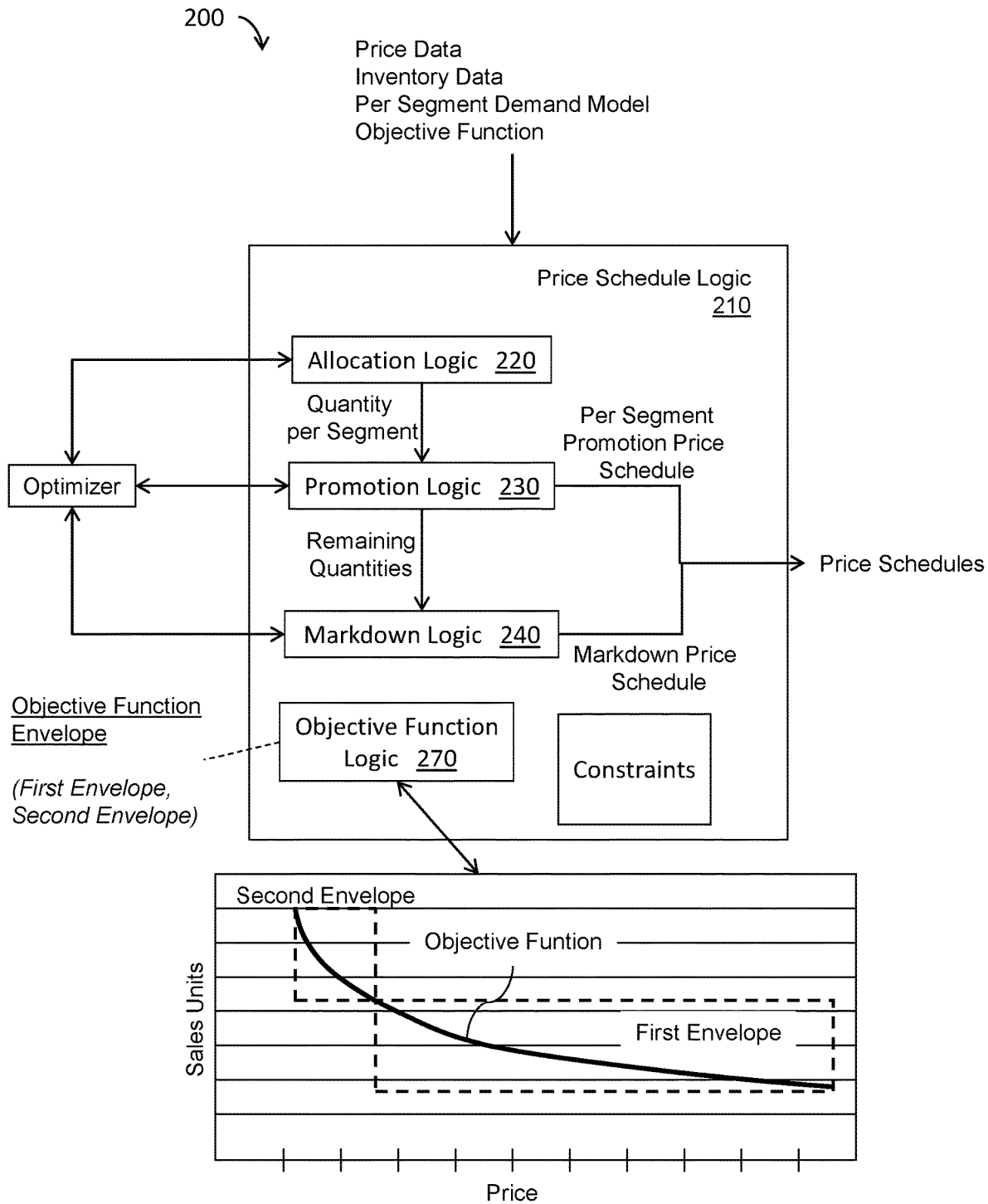

FIG. 2D illustrates how one embodiment of the objective function logic 270 determines the envelope constraints that approximate the objective function. The objective function is typically non-linear and also non-convex. However, in light of the fact that the objective function's terms are bilinear, the objective function logic 270 may use the McCormick relaxation technique to approximate the objective function using a series of linear envelopes. In one embodiment, two envelopes are used. The objective function shown in FIG. 2D is revenue, however, the profits objective function can be handled by including appropriate linear terms. The objective function logic 270 calculates the following parameters, which are used to generate two sets of envelope constraints, where the objective function is split at the point at which half the sales occur on either side of the point:

| | |
|---|---|
| $P_{L,i}^{t,seg}$ | Min. price point in the price ladder for product i at time t in segment seg. |
| $P_{U,i}^{t,seg}$ | Max. price point in the price ladder for product i at time t in segment seg |
| $Y_{MAX,i}^{t,seg} = d_i^{t,seg}(P_{L,i}^{t,seg})$ | Max. Sales for product i at time t in segment seg |
| $Y_{MIN,i}^{t,seg} = \min(0, d_i^{t,seg}(P_{U,i}^{t,seg}))$ | Min. Sales for product i at time t in segment seg |
| $Y_{L,i}^{1,t,seg} = Y_{MIN,i}^{t,seg}$ | Min. Sales for first envelope for product i at time t in segment seg |

-continued

| | |
|---|---|
| $Y_{U,i}^{1,t,seg} =$ $0.5(Y_{MIN,i}^{t,seg} + Y_{MAX,i}^{t,seg})$ | Max. Sales for first envelope for product i at time t in segment seg |
| $Y_{L,i}^{2,t,seg} =$ $0.5(Y_{MIN,i}^{t,seg} + Y_{MAX,i}^{t,seg})$ | Min. Sales for second envelope for product i at time t in segment seg |
| $Y_{U,i}^{2,t,seg} = Y_{MAX,i}^{t,seg}$ | Max. Sales for second envelope for product i at time t in segment seg |

The calculated (price, sales points) are used to define the envelopes as shown in FIG. 2D. The approximate objective function derived by the objective function logic 270, expressed in terms of the objective function envelope constraints, is shown in mathematical terms in constraint C9.

Returning to FIG. 2A, the multi-stage process utilized by the price schedule logic 210 to generate the price schedule for an item will now be described. Recall that the allocation logic 220 allocates the inventory quantity amongst the customer segments based on a predicted contribution of each customer segment to the objective function (e.g., revenue). The allocation logic 220 uses the optimizer to predict the contributions of each segment as follows. The allocation logic 240 allocates the entire inventory quantity (including initial inventory and any replenishment) to each segment. The allocation logic 240 modifies an "inventory conservation" constraint (C6) as follows using segment-wise inventory and replenishment variables:

$$\forall i \in \mathbb{P}, t \in \mathbb{T}, t \geq 2: I_i^{t,seg} = I_i^{t-1,seg} + \sup_i^{t,seg} - y_i^{t,seg} \quad \text{EQ 3}$$

In Equation 4, $\mathbb{P}$ is the set of items, $\mathbb{T}$ is the set of time periods in entire season, $I_i^{t,seg}$ is the inventory of item "i" in customer segment "seg" at the beginning of time period "t" (i.e., the entire inventory quantity for the item), $\sup_i^{t,seg}$ is the replenishment of item "i" in customer segment "seg" at the beginning of time period "t" (i.e., the entirety of replenishments for the item), and $y_i^{t,seg}$ is the sales of item "i" in customer segment "seg" during time period "t".

The allocation logic 220 adjusts a "markdown price change limit" constraint C4 using segment-wise variables as follows:

$$\forall i \in \mathbb{P}, seg \in \mathbb{S}: \sum_{t=1}^{T_R} x_i^{t,seg} \leq MPROMS_i \text{ and} \quad \text{EQ 4}$$

$$\forall i \in \mathbb{P}, t \in \mathbb{T}_C: \sum_{i=1}^{N} x_i^{t,seg} \leq MPRODS_t$$

In Equation 5, S is the set of customer segments, $T_R$ is the set of time periods in the regular season, $MPRODS_t$ is the number of products that can be marked down in time period "t", $x_i^{t,seg}$ is one when there is a price change for item "i" in customer segment "seg" at time "t", $MPROMS_i$ is the number of times an item "i" can be marked down during the time periods in the clearance season, and $y_i^{t,seg}$ is the sales of item "i" in customer segment "seg" during time period "t", and $\mathbb{T}_c$ is the set of time periods in the clearance season.

The allocation logic 220 feeds the full inventory quantity allocated to each segment, the modified "inventory conservation" constraint C6, the modified "markdown price change limits" constraint C4, the price line constraint C1, the demand piece constraint C8, the objective function envelope constraint C9, and the constraints C2, C3, and C7 to the optimizer. Note that, in one embodiment, the allocation logic 220 does not include a sell-through constraint C5 in the problem formulation used to allocate the inventory. The sell-through constraint specifies a certain amount of inventory that is to be sold during the entire selling season (e.g., 90%). Dropping this constraint reduces the chance that the optimizer will be unable to solve for an optimal objective function.

The optimizer obtains an optimal objective function $Z^*_{seg}$ for each customer segment based on this full allocation of inventory to the customer segment and transmits the optimal objective function for each customer segment to the allocation logic 220. The allocation logic 220 calculates an inventory allocation ratio $r_{seg}$ for each customer segment as follows:

$$r_{seg} = \frac{Z^*_{seg}}{\sum_{s' \in \mathbb{S}} Z^*_{s'}} \quad \text{EQ 5}$$

The allocation logic 220 then allocates the inventory quantity (including replenishment, if any) to each customer segment according to its inventory allocation ratio.

The promotion logic 230 is configured to generate the promotion portion of the price schedule. For each customer segment, the promotion logic 230 modifies the "inventory conservation" constraint C6 to handle only a single customer segment as follows:

$$\forall i \in \mathbb{P}, t \in \mathbb{T} - \{1\}: I_i^{t,seg} = I_i^{t-1,seg} + \sup_i^{t,seg} - y_i^{t,seg} \quad \text{EQ 6}$$

The promotion logic 230 modifies the "sell-through" constraint C5 for each segment as follows:

$$\forall i \in \mathbb{P}, t \in \mathbb{T}: I_i^{t,seg} - y_i^{t,seg} \leq (1 - ST_i^t) I_i^{t,seg} \quad \text{EQ 7}$$

In Equation 8, $ST_i^t$ is the sell-through target for product i at end of time-period t.

For each customer segment, the promotion logic 230 feeds the inventory quantity allocated to the segment, the modified "inventory conservation" constraint C6, the modified "sell-through" constraint C5, the price line constraint C1, the per-segment demand piece constraint C8, the objective function envelope constraint C9, and the constraints C2, C3, C6, and C7 to the optimizer. In one embodiment, additional constraints that reflect business rules (see Constraints section below) are provided to the optimizer. The optimizer obtains an optimal objective function $Z^*_{seg}$ for each customer segment based on optimal promotion prices $p\_opt_i^{t,seg}$ expressed as position variables $w_i^{t,seg}$ for each price in the time periods in the regular season. The promotion logic 230 is configured to select, from the "true" price ladder for the item, the promotion price value $p_i^{t,seg}$ that corresponds to the selected position variable $w_i^{t,seg}$. An example is shown below:

| $w_i^{t,seg}$ (position variable) | $p_i^{t,seg}$ (approx. price ladder) | $p\_opt_i^{t,seg}$ (true price ladder) |
|---|---|---|
| 0 | 1.00 | 1.00 |
| 1 | 0.90 | 0.90 |
| 2 | 0.79 | ➔ 0.80 |
| 3 | 0.77 | 0.78 |
| 5 | 0.67 | 0.65 |

When the optimizer returns the position variable value of 2, which corresponds to price 0.79 on the price line, the promotion logic selects the "true" price of 0.80 that is associated with the position variable 2. The selected prices for each time period in the regular season make up the promotion portion of the price schedule.

The markdown logic 240 is configured to generate the markdown portion of the price schedule. The markdown logic 240 drops all regular season time periods because the item is being priced for the clearance season.

$$\mathbb{T}_R = \phi;\ \mathbb{T} = \mathbb{T}_c.\text{ This means that } 1 \le t \le T_c \qquad \text{EQ 8}$$

The markdown logic calculates the aggregated inventory quantity as:

$$I_i^1 = \Sigma_{seg \in \mathbb{S}} I_i^{TR+1,seg} \qquad \text{EQ 9}$$

The markdown logic 240 feeds the aggregated inventory quantity, the price line constraint C1, the aggregated demand piece constraint C8, the objective function envelope constraint C9, and the constraints C2-C7 to the optimizer. In one embodiment, additional constraints that reflect business rules (see Constraints section below) are provided to the optimizer.

The optimizer obtains an optimal objective function based on optimal markdown prices $pm\_opt_i^t$ expressed as position variables w for each price in the clearance season time periods. The markdown logic 240 is configured to select, from the "true" price ladder for the item, the markdown price value that corresponds to the selected position variable as described above. The selected prices for each time period in the clearance season make up the markdown portion of the price schedule. The price schedule logic 10 is configured to combine the promotion portion with the markdown portion to generate the price schedule that is transmitted to the retailer.

Figure 3:
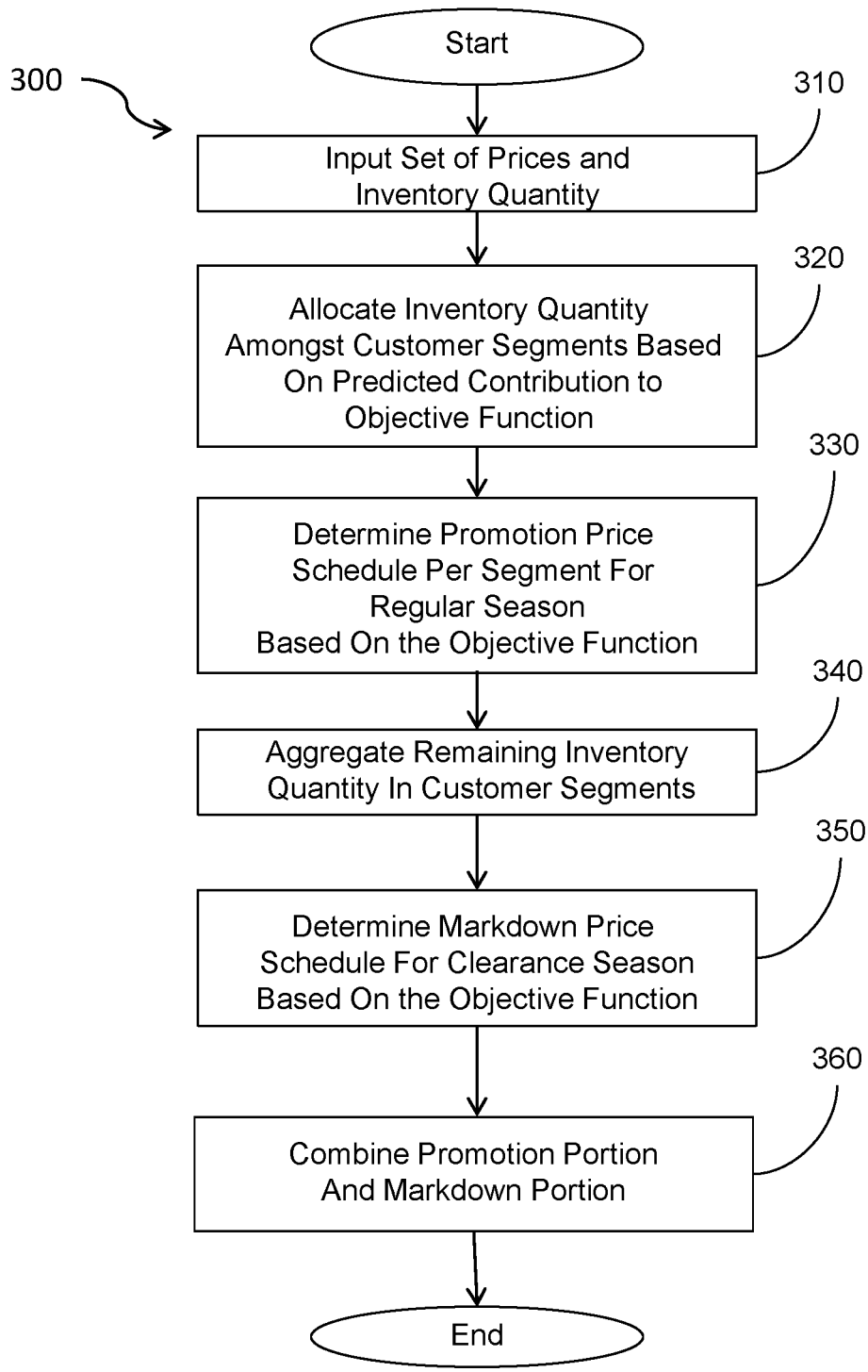
FIG. 3 illustrates one embodiment of a method associated with promotion and markdown price scheduling.

FIG. 3 illustrates one embodiment of a method 300 associated with to determining a price schedule for each item in a group of items. At 310, a set of prices for the item, an inventory quantity for the item, a per-segment demand model for the item, and an objective function that is a function of the per-segment demand model are input. This step may be performed by the price schedule logic 110 or 210 of FIGS. 1 and 2A-2D. In one embodiment, the data corresponding to the set of prices is stored in records in a database table or other database structure that can be queried by the price schedule logic 110. In one embodiment, data describing the set of prices and inventory quantity are stored in registers or memory addresses, the contents of which may be read, input, or transferred into the working memory of the price schedule logic 110. In one embodiment, data structures encoding the per-segment demand model and a selected objective function are received by way of an electronic communication from a retailer that is parsed to identify the data structures.

At 320, the method includes allocating the inventory quantity amongst a plurality of customer segments based at least on a predicted contribution of each customer segment to the objective function. This step may be performed by the allocation logic 120 or 220 of FIGS. 1 and 2A-2D. A processor is controlled by the allocation logic 110 or 220 to allocate the inventory quantity (see FIG. 4).

For each customer segment, based at least on a quantity of inventory allocated to the customer segment, a promotion portion of the price schedule that maximizes the objective function is determined at 330. The promotion portion assigns to the item a series of prices selected from the set of prices for respective time periods during a regular season for the item. This step may be performed by the promotion logic 240 of FIGS. 1 and 2A-2D. A processor is controlled by the promotion logic 240 to create the promotion portion of the price schedule (see FIG. 4).

At 340 the method includes aggregating a quantity of remaining inventory allocated to the plurality of customer segments at an end of the regular season. This step may be performed by the markdown logic 250 of FIGS. 1 and 2A-2D. A processor is controlled by the markdown logic 250 aggregate the remaining inventory (see FIG. 4).

At 350, based at least on the aggregated inventory, a markdown portion of the price schedule for the item that maximizes the objective function is determined. The markdown portion assigns a series of prices selected from the set of prices for respective time periods during a clearance season for the item. This step may be performed by the markdown logic 250 of FIGS. 1 and 2A-2D. A processor is controlled by the markdown logic 250 to create the markdown portion of the price schedule (see FIG. 4).

The promotion portion and the markdown portion are combined to create a price schedule for the item at 360. This step may be performed by the price schedule logic 110 or 210 of FIGS. 1 and 2A-2D. A processor is controlled by the price schedule logic 110 or 210 to combine the promotion portion and the markdown portion (see FIG. 4).

In one embodiment, an electronic communication that includes the price schedule is transmitted, by way of a network or internet connection, to a computing device of the retailer. In one embodiment, the price schedule causes the computing device of the retailer to modify/adjust prices of items in data records of an inventory/pricing database according to the price schedule. The modified/adjusted prices provide a pricing solution to improve the selected objective function in a manner that observes the selected constraints.

In one embodiment, the method 300 includes allocating the inventory quantity amongst customer segments by performing the following steps for each customer segment: allocating an entirety of the inventory quantity to the customer segment; transmitting the entirety of the inventory quantity, the set of prices, an approximate per-segment demand model, a first set of constraints, and an approximate objective function to an optimizer; receiving, from the optimizer, a per segment value of the approximate objective function for the customer segment; computing a ratio of the per segment value to a sum of all per segment values for the customer segments; and allocating the inventory amongst the customer segments according to the ratio for each customer segment. These steps may be performed by the allocation logic 220 of FIG. 2A controlling a processor (see FIG. 4).

In one embodiment, the method 300 includes determining the promotion portion for each customer segment by performing the following steps: providing the set of prices, the inventory quantity allocated to the customer segment, the approximate per-segment demand model, a second set of constraints, and the approximate objective function to the optimizer; and receiving, from the optimizer, a promotion portion for each customer segment that optimizes the objective function. These steps may be performed by the promotion logic 230 of FIG. 2A controlling a processor (see FIG. 4).

In one embodiment, the method 300 includes determining the markdown portion by performing the following steps: providing the set of prices, the aggregated inventory, an approximate aggregate demand model for the item, a third set of constraints, and the approximate objective function to the optimizer; and receiving, from the optimizer, a markdown portion that optimizes the objective function. These steps may be performed by the markdown logic 240 of FIG. 2A controlling a processor (see FIG. 4).

In one embodiment, the method 300 includes calculating a line corresponding to a linear approximation of the set of prices, where the line is a function of a position variable that evenly divides the line into segments between a maximum price and a minimum price, where each integer value of the position variable is associated with a price in the set of prices. These steps may be performed by the price logic 250 of FIG. 2B controlling a processor (see FIG. 4). An equation of the line is provided to the optimizer as the set of prices for the item; an integer value for the position variable that corresponds to a selected price is received from the optimizer; a price in the set of prices is identified that corresponds to the position variable; and the identified price is included in the price schedule for the item. These steps may be performed by the allocation logic 220, the promotion logic 230, or the markdown logic 240 of FIG. 2A controlling a processor (see FIG. 4).

In one embodiment, the method 300 includes determining the promotion portion for each customer segment by, for each time period, performing the following steps: calculating a set of customer segment demands for the item when the item is priced at respective prices in the set of prices; calculating a plurality of lines corresponding to a piecewise linear approximation of the set of customer segment demands; and for each price, selecting a line that corresponds to a highest demand at the price. These steps may be performed by the demand logic 260 of FIG. 2C controlling a processor (see FIG. 4). An equation for the selected line is provided to the optimizer as the approximate per-segment demand model for the price during the time period. This step may be performed by the allocation logic 220, the promotion logic 230, or the markdown logic 240 of FIG. 2A controlling a processor (see FIG. 4).

In one embodiment, the method 300 includes determining the markdown portion for the item by, for each time period, performing the following steps: for each customer segment, calculating a set of customer segment demands for the item when the item is priced at respective prices in the set of prices; calculating a set of respective aggregate demands by aggregating respective customer segment demands for each price; calculating a plurality of lines corresponding to a piecewise linear approximation of the set of aggregate demands; and for each price, select a line that corresponds to a highest demand at the price. These steps may be performed by the demand logic 260 of FIG. 2C controlling a processor (see FIG. 4). An equation for the selected line is provided to the optimizer as the approximate aggregate demand model for the price during the time period. This step may be performed by the allocation logic 220, the promotion logic 230, or the markdown logic 240 of FIG. 2A controlling a processor (see FIG. 4).

In one embodiment, the method 300 includes determining the approximate objective function by, for each time period, performing the following steps: based on at least on the approximate demand model for the time period, calculating sales for the item at prices in the set of prices; dividing the objective function into a plurality of segments based at least on the calculated sales; and for each segment of the objective function, determine a linear envelope that covers the segment. These steps may be performed by the objective function logic 270 of FIG. 2D controlling a processor (see FIG. 4). A set of constraints describing the linear envelopes is provided to the optimizer as the approximate objective function for the item during the time period. This step may be performed by the allocation logic 220, the promotion logic 230, or the markdown logic 240 of FIG. 2A controlling a processor (see FIG. 4).

Constraints

A user of the system 100 may selectively enable and specify several different business related constraints. These constraints will be provided to the optimizer by the allocation logic 220, the promotion logic 230, and the markdown logic 240. Example business related constraints will now be described. Of course, any number of other constraints on possible prices for items may be presented to the optimizer to constrain the optimizer's solution in accordance with a retailer's pricing policies.

A "self no-touch" constraint models the fact that two consecutive promotions of a specific item should be separated by a few time periods (e.g., minimum of two weeks between consecutive promotions). A retailer may choose to enable this constraint for certain (or all) items and, for each item, specify the minimum number of time periods between consecutive promotions. One possible mathematical formulation of the "self no-touch" constraint suitable for input to an MIP solver is presented in mathematical form as constraint C10 in appendix A.

A "cross no-touch" constraint models the fact that two consecutive promotions of any two different items should be separated by a few time periods (e.g., minimum of two weeks between consecutive promotions for yogurt of any brand). A retailer may choose to enable this constraint for certain (or all) sets of items and, for each set of items, specify the minimum number of time periods between consecutive promotions. One possible mathematical formulation of the "cross no-touch" constraint suitable for input to an MIP solver is presented in mathematical form as constraint C11 in appendix A.

Set constraints include "must-promote sets of items" and "cannot-promote sets of items." Items in a "must-promote set" must be promoted together. For example, if there are three products of a shampoo brand (e.g., shampoo, conditioner, and hair spray), a retailer may want to put all the three products on promotion at the same time. A retailer may choose to enable the must-promote set constraint for certain sets of items. Items in a "cannot-promote set" cannot be promoted together. For example, a retailer may not want to put a highly popular shampoo product and a low-seller shampoo product on promotion at the same time. A retailer may choose to enable the "cannot-promote set" constraint for certain sets of items. One possible mathematical formulation of the "must-promote set" constraint and the "cannot-promote set" constraint suitable for input to an MIP solver is presented in mathematical form as constraints C12 and C13, respectively, in appendix A.

Inter-item constraints can be used by a retailer to impose price restrictions that maintain the price order between two items. For example, a retailer may want to specify that the price of a national brand item should always be higher than a private label brand item. Another example would be to maintain the price relation between a 2-pack of 2-liter Coke bottles and a 4-pack of 2-liter Coke bottles. A retailer may choose to enable the inter-item constraints for certain sets of items. The retailer specifies the relationships between prices of items in the set that must be maintained. One possible mathematical formulation of the "cross no-touch" constraint suitable for input to an MIP solver is presented in mathematical form as constraint C14 in appendix A.

It can be seen from the foregoing description that the systems and methods described herein include a single layer of approximations to produce a mixed integer linear programming problem of the same dimension. Stock-outs, which impose additional non-smoothness to sales models, are taken into account by the described techniques. Multiple promotion price schedules targeting multiple different customer segments, each with different pricing preferences, are produced by the described techniques. The described framework computes the promotion portion of the price schedule for different customer segments in a manner that makes it possible to utilize mixed integer problem (MIP) solver-based parallelization. The described techniques can be applied to any demand model regardless of whether the model is non-linear or non-convex. Further, many different business constraints can be included in the solution process.

For simplicity sake in this description the terms objective function, approximate objective function, coefficient, variable, constraint, demand model, approximate demand model, and value have been used. It is to be understood that these terms are to be interpreted as meaning data or data structures that encode the objective function, approximate objective function, coefficient, variable, constraint, demand model, approximate demand model, or value in a manner interpretable by the computing elements described above. Inputting, outputting, receiving, transmitting, or other manipulation of these terms is to be interpreted as storing data in a storage medium, reading data from a storage medium, transmitting or receiving data by way of a network connection, acting on the data with a processor, as appropriate. Further, the term retailer should be interpreted as a computing device or devices under control of a retailer i) seeking a promotion and markdown portion or ii) pricing items according to the price schedule produced by the systems and methods described herein.

Computing Device Embodiment

Figure 4:
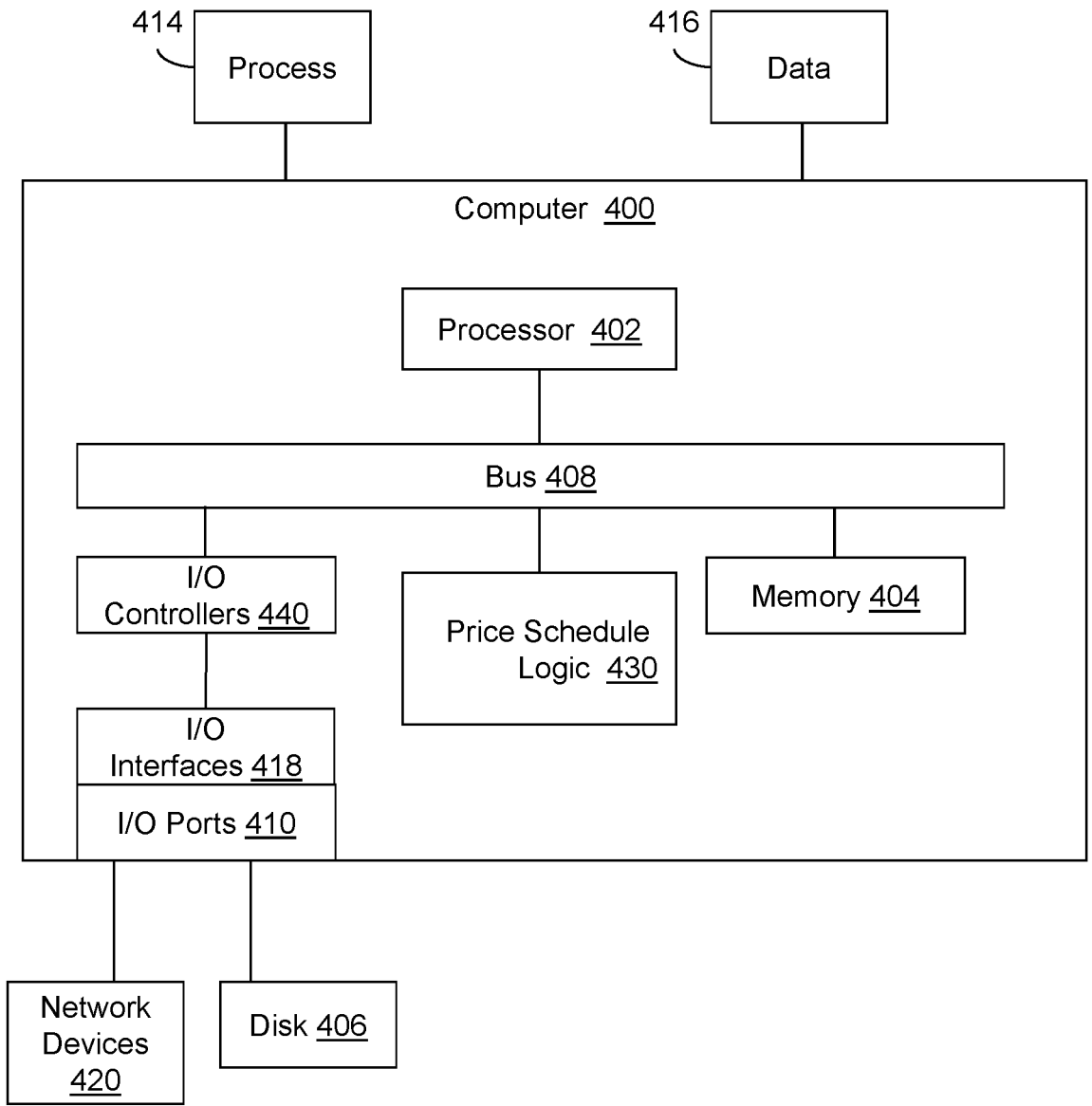
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include price schedule logic 430 configured to create a promotion price and markdown schedule in a manner similar to the price schedule logic 110 shown in FIG. 1 and further explained in FIGS. 2A-2D. In different examples, the price schedule logic 430 may be implemented in hardware, a non-transitory computer-readable medium with stored instructions, firmware, and/or combinations thereof. While the price schedule logic 430 is illustrated as a hardware component attached to the bus 408, it is to be appreciated that in other embodiments, the price schedule logic 430 could be implemented in the processor 402, stored in memory 404, or stored in disk 406.

In one embodiment, price schedule logic 430 or the computer is a means (e.g., structure: hardware, non-transitory computer-readable medium, firmware) for performing the actions described in FIGS. 1-3. In some embodiments, the computing device may be a server operating in a cloud computing system, a server configured in a "Software as a Service" (SaaS) architecture, a smart phone, laptop, tablet computing device, and so on.

The means may be implemented, for example, as an application specific integrated circuit (ASIC) programmed to perform the method 300 of FIG. 3, as further explained in FIGS. 1 and 2A-2D. The means may also be implemented as stored computer executable instructions that are presented to computer 400 as data 416 that are temporarily stored in memory 404 and then executed by a processor 402.

Price schedule logic 430 may also provide means (e.g., hardware, non-transitory computer-readable medium that stores executable instructions, firmware) for performing the method 300 of FIG. 3, as further explained in FIGS. 1 and 2A-2D.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 406 may be operably connected to the computer 400 via, for example, an input/output interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a compact disk-read only memory (CD-ROM) drive, a CD recordable (CD-R) drive, a CD read/write (CD-RW) drive, a digital video disc (DVD) ROM, and so on. The memory 404 can store a process 414 and/or a data 416, for example. The disk 406 and/or the memory 404 can store an operating system that controls and allocates resources of the computer 400.

The computer 400 may interact with input/output devices through the input/output (I/O) controller 440, the input/output (I/O) interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and universal serial bus (USB) ports.

The computer 400 can operate in a network environment and thus may be connected to the network devices 420 via the I/O interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the functions as described herein when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User" or "Retailer", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

Appendix A

Notation

| Set/Symbol | Size | Indices | Description |
|---|---|---|---|
| $\mathbb{P}$ | $N$ | $i$ | Set (number) of products |
| $\mathbb{S}$ | $S$ | $seg$ | Set (number) of customer segments |
| $\mathbb{T}$ | $T$ | $t$ | Set (number) of time periods for entire season (e.g., $1...T$) |
| $\mathbb{T}_R$ | $T_R$ | $t$ | Set (number) of time periods for regular season |
| $\mathbb{T}_C$ | $T_C$ | $t$ | Set (number) of time periods for clearance season |
| $SUP_i^t$ | | | Replenishments for product $i$ at beginning of time period $t$ |
| $I_i^1$ | | | Initial inventory of an item $i$ at the start of the season |
| $P_i^{full}$ | | | Full or regular price of product $i$ (e.g., $45.99) |
| $C_i$ | | | Cost of product $i$ |
| $P_i^{fullnorm}$ | | | Normalized regular/full price of product $i$ (usually equals 1) |
| $C_i^{norm}$ | | | Normalized cost of product $i$ (equals $C_i/P_i^{full}$) |
| $\mathbb{L}_i^p$ | $L_i^p$ | | Promotion Price ladder for product $i$ (e.g., 1, 0.95, 0.90, ...) |
| $\mathbb{L}_i^m$ | $L_i^m$ | | Markdown Price ladder for product $i$ |
| $\mathbb{L}_i^{pp}$ | $L_i^{pp}$ | | Planned Promotion Price ladder for product $i$ |
| $ST_i^t$ | | | Sell-through target for product $i$ at end of time-period $t$ |
| $PPROMS_i$ | | | Number of times a product $i$ can be promoted in $T_R$ periods |
| $PPRODS_t$ | | | Number of products that can be promoted in time-period $t$ |
| $MPROMS_i$ | | | Number of times a product $i$ can be marked down in $T_C$ periods |
| $MPRODS_t$ | | | Number of products that can be marked down in time-period $t$ |

Demand Parameters

| Demand Parameter | Definition |
|---|---|
| $\gamma M_i^{t,seg}$ | Markdown price elasticity of an item $i$ for segment $seg$ at time $t$ |
| $\gamma P_i^{t,seg}$ | Promotion price elasticity of an item $i$ for segment $seg$ at time $t$ |

| | |
|---|---|
| $\gamma PP_i^{t,seg}$ | Planned promotion price elasticity of an item $i$ for segment $seg$ at time $t$ |
| $PF_i^{t,seg}$ | Promo fatigue of price elasticity for an item $i$ for segment $seg$ at time $t$ |
| $SEA_i^{t,seg}$ | Seasonality of an item $i$ at time $t$ for segment $seg$ |
| $B_i^{t,seg}$ | Base demand (level) of an item $i$ at time $t$ for segment $seg$ |
| $RP_i^{seg}$ | Return percentage of an item $i$ for segment $seg$ |
| $RL_i^{seg}$ | Return lead time of an item $i$ for segment $seg$ |

Decision Variables

| Decision variables | |
|---|---|
| $p_i^{t,seg}$ | Promotion Price of an item $i$ in customer segment $seg$ at time $t$ ($t \in \mathbb{T}_R$) |
| $pm_i^t$ | Markdown price of an item $i$ at time $t$ ($t \in \mathbb{T}_C$) |
| $I_i^t$ | Inventory of an item $i$ at beginning of time-period $t$ ($I_i^1$ = initial inventory of an item $i$) |
| $\theta_i^{t,seg}$ | Revenue or Profit of an item $i$ in customer segment $seg$ at time $t$ ($t \in \mathbb{T}$) |
| Auxiliary decision variables | |
| $x_i^{t,seg}$ | Equals 1 when there is a price change for product $i$ in customer segment $seg$ at time $t$ |
| $u_i^{t,seg}$ | Equals 1 when there is a price change for product $i$ in customer segment $seg$ at time $t$ when compared to time period $t-1$ |
| $v_i^{t,seg}$ | Equals 1 when there is a price change for product $i$ in customer segment $seg$ at time $t$ when compared to regular price in time period $t$ |
| $y_i^{t,seg}$ | Sales of product $i$ in customer segment $seg$ at time $t$ |
| $d_i^{t,seg}$ | Demand for product $i$ in customer segment $seg$ at time $t$ |
| $z_i^{t,seg}$ | Variable denoting McCormick relaxation for $p_i^{t,seg} \times y_i^{t,seg}$ |
| $w_i^{t,seg}$ | Index denoting which point in ladder is picked |
| $\kappa_i^{t,seg}$ | Equals 1 when there is a price change for product $i$ in customer segment $seg$ at time $t$ |
| $\delta_i^t$ | Equals 1 when there is a price change for product $i$ in customer segment $seg$ at time $t$ |
| $I_i^{t,seg}$ | Inventory of an item $i$ at beginning of time-period $t$ for customer segment $seg$ ($I_i^{1,seg}$ = initial inventory of an item $i$ for segment $seg$) |
| $sup_i^{t,seg}$ | Replenishment of an item $i$ at beginning of time-period $t$ for customer segment $seg$ |
| $bd_i^{t,seg}$ | Binary variable equals 1 when the first line is chosen for the demand approximation; 0 for choosing second line |
| $bmck_i^{1,t,seg}$ | Binary variable equals 1 when the first piece is chosen for McCormick approximation for an item $i$ at time-period $t$ for customer segment $seg$; 0 |

| | |
|---|---|
| | otherwise. |
| $bmck_i^{2,t,seg}$ | Binary variable equals 1 when the second piece is chosen for McCormick approximation for an item $i$ at time-period $t$ for customer segment $seg$; 0 otherwise. |
| Output variables | |
| $p\_opt_i^{t,seg}$ | Optimal promotion price of an item $i$ in customer segment $seg$ at time $t$ ($t \in T_R$) |
| $pm\_opt_i^t$ | Optimal markdown price of an item $i$ at time $t$ ($t \in T_C$) |
| $I\_opt_i^t$ | Optimal inventory of an item $i$ at beginning of time-period $t$ |
| $y\_opt_i^{t,seg}$ | Optimal sales of product $i$ in customer segment $seg$ at time $t$ |
| ** Please note that superscript $seg$ is dropped when dealing with clearance periods | |

CONSTRAINTS

| Objective function | McCormick Approximation Formulation |
|---|---|
| Maximize Revenue | $$\max \sum_{i=1}^{N} \sum_{t=1}^{T_R} \sum_{seg=1}^{S} P_i^{full} \theta_i^{t,seg} + \sum_{i=1}^{N} \sum_{t=T_R+1}^{T} P_i^{full} \theta_i^t$$ |

| C#: Name (prefix) | Inequalities |
|---|---|
| C1: price ladder (pricelad) | $\forall i \in \mathbb{P}, t \in \mathbb{T}_R, seg \in \mathbb{S}: p_i^{t,seg} = \hat{\alpha}_i^{t,seg} - \hat{\beta}_i^{t,seg} w_i^{t,seg}$ <br> $\forall i \in \mathbb{P}, t \in \mathbb{T}_C: pm_i^t = \hat{\alpha}_i^t - \hat{\beta}_i^t w_i^t$ |
| C2: Price Change Identification (pricechid) | $\forall i \in \mathbb{P}, t \in \mathbb{T}_R, seg \in \mathbb{S}: p_i^{fullnorm} - p_i^{t,seg} \geq \dfrac{v_i^{t,seg}}{M_1}$ <br> $\forall i \in \mathbb{P}, t \in \mathbb{T}_R, seg \in \mathbb{S}: p_i^{fullnorm} - p_i^{t,seg} \leq v_i^{t,seg} M_1$ <br> $\forall i \in \mathbb{P}, t \in \mathbb{T}_R, seg \in \mathbb{S}: p_i^{t-1,seg} - p_i^{t,seg} + \dfrac{u_i^{t,seg}}{M_1} \leq \kappa_i^{t,seg} M_1$ <br> $\forall i \in \mathbb{P}, t \in \mathbb{T}_R, seg \in \mathbb{S}: p_i^{t,seg} - p_i^{t-1,seg} + \dfrac{u_i^{t,seg}}{M_1} \leq (1 - \kappa_i^{t,seg}) M_1$ <br> $\forall i \in \mathbb{P}, t \in \mathbb{T}_R, seg \in \mathbb{S}: x_i^{t,seg} \leq u_i^{t,seg}$ <br> $\forall i \in \mathbb{P}, t \in \mathbb{T}_R, seg \in \mathbb{S}: x_i^{t,seg} \leq v_i^{t,seg}$ <br> $\forall i \in \mathbb{P}, t \in \mathbb{T}_R, seg \in \mathbb{S}: 1 + x_i^{t,seg} \geq u_i^{t,seg} + v_i^{t,seg}$ |

| | |
|---|---|
| | $\forall i \in \mathbb{P}, t \in \mathbb{T}_C$: Repeat above by dropping superscript $seg$ and using $pm_i^t$<br>Add the markdown count constraints |
| C3: Promo Price Change Limits (ppricechlt) | $\forall i \in \mathbb{P}, t \in \mathbb{T}_R, seg \in \mathbb{S}: \sum_{t=1}^{T_R} x_i^{t,seg} \leq PPROMS_i$<br><br>$\forall i \in \mathbb{P}, t \in \mathbb{T}_R, seg \in \mathbb{S}: \sum_{i=1}^{N} x_i^{t,seg} \leq PPRODS_t$ |
| C4: Markdown Price Change Limits (mpricechlt) | $\forall i \in \mathbb{P}: \sum_{t \in \mathbb{T}_C} x_i^t \leq MPROMS_i$<br><br>$\forall i \in \mathbb{P}, t \in \mathbb{T}_C: \sum_{i=1}^{N} x_i^t \leq MPRODS_t$ |
| C5: Sell-through (sellthru) | $\forall i \in \mathbb{P}, t \in \mathbb{T}: I_i^t - \sum_{seg \in \mathbb{S}} y_i^{t,seg} \leq (1 - ST_i^t) I_i^1$ |
| C6: Inventory conservation (invflow) | $\forall i \in \mathbb{P}, t \in \mathbb{T}, t \geq 2: I_i^t = I_i^{t-1} + SUP_i^t - \sum_{seg \in \mathbb{S}} y_i^{t,seg}$ |
| C7: Sales calculation (salescalc) | $\forall i \in \mathbb{P}, t \in \mathbb{T}_R: \sum_{seg \in \mathbb{S}} y_i^{t,seg} \leq \sum_{seg \in \mathbb{S}} \hat{d}_i^{t,seg}$ and $\sum_{seg \in \mathbb{S}} y_i^{t,seg} \leq I_i^t + SUP_i^t$<br>$\forall i \in \mathbb{P}, t \in \mathbb{T}_R, seg \in \mathbb{S}: y_i^{t,seg} \geq \hat{d}_i^{t,seg} - \delta_i^t M_2$<br>$\forall i \in \mathbb{P}, t \in \mathbb{T}_R, seg \in \mathbb{S}: \sum_{seg \in \mathbb{S}} y_i^{t,seg} \geq I_i^t + SUP_i^t - (1 - \delta_i^t) M_2$<br>$\forall i \in \mathbb{P}, t \in \mathbb{T}_C: y_i^t \leq \hat{d}_i^t$ and $y_i^t \leq I_i^t + SUP_i^t$<br>$\forall i \in \mathbb{P}, t \in \mathbb{T}_C: y_i^t \geq \hat{d}_i^{t,seg} - \delta_i^t M_2$<br>$\forall i \in \mathbb{P}, t \in \mathbb{T}_C: y_i^t \geq I_i^t + SUP_i^t - (1 - \delta_i^t) M_2$ |
| C8: Demand calculation (demcalc) | $\forall i \in \mathbb{P}, t \in \mathbb{T}_R, seg \in \mathbb{S}:$<br>$\hat{d}_i^{t,seg} \leq \bar{m}_i^{t,seg} p_i^{t,seg} + \bar{c}_i^{t,seg} + (1 - bd_i^{t,seg}) M_3$<br>$\hat{d}_i^{t,seg} \leq \hat{m}_i^{t,seg} p_i^{t,seg} + \hat{c}_i^{t,seg} + bd_i^{t,seg} M_3$<br>$\bar{m}_i^{t,seg} p_i^{t,seg} + \bar{c}_i^{t,seg} \leq \hat{m}_i^{t,seg} p_i^{t,seg} + \hat{c}_i^{t,seg} + bd_i^{t,seg} M_3$<br>$\hat{m}_i^{t,seg} p_i^{t,seg} + \hat{c}_i^{t,seg} \leq \bar{m}_i^{t,seg} p_i^{t,seg} + \bar{c}_i^{t,seg} \leq + (1 - bd_i^{t,seg}) M_3$<br>$\forall i \in \mathbb{P}, t \in \mathbb{T}_C:$<br>$y_i^t \leq \bar{m}_i^t pm_i^t + \bar{c}_i^t + (1 - bd_i^t) M_3$<br>$y_i^t \leq \hat{m}_i^t pm_i^t + \hat{c}_i^t + bd_i^t M_3$<br>$\bar{m}_i^t pm_i^t + \bar{c}_i^t \leq \hat{m}_i^t pm_i^t + \hat{c}_i^t + bd_i^t M_3$<br>$\hat{m}_i^t pm_i^t + \hat{c}_i^t \leq \bar{m}_i^t pm_i^t + \bar{c}_i^t + (1 - bd_i^t) M_3$ |

| | |
|---|---|
| C9: objective function McCormick approximation (objmck) | $\forall i \in \mathbb{P}, t \in \mathbb{T}_R, seg \in \mathbb{S}$: (first piece)<br>$\theta_i^{t,seg} \geq Y_{U,i}^{1,t,seg} p_i^{t,seg} + P_{U,i}^{t,seg} y_i^{t,seg} - Y_{U,i}^{1,t,seg} P_{U,i}^{t,seg} - (1 - bmck_i^{1,t,seg})M_4$<br>$\theta_i^{t,seg} \geq Y_{L,i}^{1,t,seg} p_i^{t,seg} + P_{L,i}^{t,seg} y_i^{t,seg} - Y_{L,i}^{1,t,seg} P_{L,i}^{t,seg} - (1 - bmck_i^{1,t,seg})M_4$<br>$\theta_i^{t,seg} \leq Y_{U,i}^{1,t,seg} p_i^{t,seg} + P_{L,i}^{t} y_i^{t,seg} - Y_{U,i}^{1,t,seg} P_{L,i}^{t,seg} + (1 - bmck_i^{1,t,seg})M_4$<br>$\theta_i^{t,seg} \leq Y_{L,i}^{1,t,seg} p_i^{t,seg} + P_{U,i}^{t,seg} y_i^{t,seg} - Y_{L,i}^{1,t,seg} P_{U,i}^{t,seg} + (1 - bmck_i^{1,t,seg})M_4$<br>$\forall i \in \mathbb{P}, t \in \mathbb{T}_R, seg \in \mathbb{S}$: (second piece)<br>$\theta_i^{t,seg} \geq Y_{U,i}^{2,t,seg} p_i^{t,seg} + P_{U,i}^{t,seg} y_i^{t,seg} - Y_{U,i}^{2,t,seg} P_{U,i}^{t,seg} - (1 - bmck_i^{2,t,seg})M_4$<br>$\theta_i^{t,seg} \geq Y_{L,i}^{2,t,seg} p_i^{t,seg} + P_{L,i}^{t,seg} y_i^{t,seg} - Y_{L,i}^{2,t,seg} P_{L,i}^{t,seg} - (1 - bmck_i^{2,t,seg})M_4$<br>$\theta_i^{t,seg} \leq Y_{U,i}^{2,t,seg} p_i^{t,seg} + P_{L,i}^{t} y_i^{t,seg} - Y_{U,i}^{2,t,seg} P_{L,i}^{t,seg} + (1 - bmck_i^{2,t,seg})M_4$<br>$\theta_i^{t,seg} \leq Y_{L,i}^{2,t,seg} p_i^{t,seg} + P_{U,i}^{t,seg} y_i^{t,seg} - Y_{L,i}^{2,t,seg} P_{U,i}^{t,seg} + (1 - bmck_i^{2,t,seg})M_4$<br>$bmck_i^{1,t,seg} + bmck_i^{2,t,seg} = 1$<br>$\forall i \in \mathbb{P}, t \in \mathbb{T}_C$: Repeat above by dropping superscript $seg$ and using $pm_i^t$ |
| C10<br>Self No-Touch | $\sum_{\tau=t}^{t+s_i} \sum_{k=1}^{K} \gamma_\tau^{ik} \leq 1 \; \forall i, t$ |
| C11<br>Cross No-Touch | $\sum_{k=1}^{K} \gamma_t^{ik} + \sum_{\tau=t}^{t+s_{ij}} \sum_{k=1}^{K} \gamma_\tau^{jk} \leq 1 \; \forall (i,j), t \in T$ |
| C12<br>Must Promote | $\sum_{k=1}^{K} \gamma_t^{ik} = \sum_{k=1}^{K} \gamma_t^{jk} \; \forall \, (i,j), t \in T$ |
| C13<br>Cannot Promote | $\sum_{k=1}^{K} \gamma_t^{ik} + \sum_{k=1}^{K} \gamma_t^{jk} \leq 1 \forall \, (i,j), t \in T$ |
| C14<br>Inter-Item | $\sum_{k=1}^{K} \gamma_t^{ik} = \sum_{k=1}^{K} \gamma_t^{jk} \; \forall \, (i,j), t \in T$ |

What is claimed is:

1. A computer-implemented method to determine a price schedule for an item, comprising:
   receiving an objective function by a computer;
   dividing the objective function into a plurality of segments;
   determining an approximate objective function that describes linear envelopes for the plurality of segments of the objective function
   for each customer segment of a plurality of customer segments,
      (i) determining a per-segment value of the approximate objective function for the customer segment by an external optimizer, wherein the per-segment value is determined based at least on an inventory quantity of the item, a set of prices for the item, an approximate per-segment demand model, and the approximate objective function transmitted to the external optimizer, and
      (ii) computing a ratio of the per-segment value to a sum of all per-segment values for the customer segments;
   allocating the inventory quantity amongst the customer segments according to the ratio for each customer segment to form an inventory quantity for each customer segment;
   for each customer segment, determining a promotion portion of the price schedule that maximizes the objective function by the external optimizer, wherein the promotion portion of the price schedule is determined based at least on the set of prices, the inventory quantity for the customer segment, the approximate per-segment demand model, and the approximate objective function;
   aggregating a quantity of remaining inventory allocated to the plurality of customer segments at an end of a date range;
   determining a markdown portion of the price schedule for the item that maximizes the objective function by the external optimizer, wherein the markdown portion of the price schedule is determined based at least on the set of prices, the aggregated quantity of remaining inventory, an approximate aggregate demand model for the item, and the approximate objective function;
   combining the promotion portion and the markdown portion to create the price schedule for the item; and
   transmitting the price schedule for the item over a network to a computing device of a retailer to control assignment of prices for the item according to the price schedule.

2. The method of claim 1, wherein the transmission of the price schedule over the network to a computing device of a retailer causes the computing device of the retailer to modify prices of the item in a pricing database according to the price schedule.

3. The method of claim 1, further comprising:
   for each time period in a set of time periods for the promotion portion,
      (i) calculating a set of customer segment demands for the item when the item is priced at respective prices in the set of prices,
      (ii) calculating a plurality of lines corresponding to a piecewise linear approximation of the set of customer segment demands, and
      (iii) for each price in the set of prices, selecting a line that corresponds to a highest demand at the price;
   wherein the approximate per-segment demand model for the price during the time period is an equation for the selected line for the price during the time period.

4. The method of claim 1, further comprising:
   for each time period in a set of time periods for the markdown portion,
      (i) for each customer segment, calculating a set of customer segment demands for the item when the item is priced at respective prices in the set of prices,
      (ii) calculating a set of respective aggregate demands by aggregating respective customer segment demands for each price,
      (iii) calculating a plurality of lines corresponding to a piecewise linear approximation of the set of aggregate demands, and
      (iv) for each price, selecting a line that corresponds to a highest demand at the price,
   wherein the approximate aggregate demand model for the price during the time period is an equation for the selected line.

5. The method of claim 1, wherein the external optimizer is a mixed integer linear programming solver, further comprising providing one or more approximation constraints to the external optimizer to reduce complexity of generating the price schedule to a feasible level for the mixed integer linear programming solver.

6. The method of claim 1, further comprising submitting an additional constraint to the external optimizer during one or more of the determination of the per-segment value, the determination of the promotion portion, and the determination of the markdown portion, wherein the additional constraint is selected from the group consisting of a self no-touch constraint, a cross no-touch constraint, a must-promote set of items constraint, a cannot-promote set of items constraint, and an inter-item constraint.

7. A non-transitory computer-readable medium storing computer-executable instructions that when executed by at least a processor of a computer cause the computer to:
   receive an objective function by the computer;
   divide the objective function into a plurality of segments;
   determine an approximate objective function that describes linear envelopes for the plurality of segments of the objective function;
   for each customer segment of a plurality of customer segments,
      (i) determine a per-segment value of the approximate objective function for the customer segment by an external optimizer, wherein the per-segment value is determined based at least on an inventory quantity of an item, a set of prices for the item, an approximate per-segment demand model, and the approximate objective function transmitted to the external optimizer, and
      (ii) compute a ratio of the per-segment value to a sum of all per-segment values for the customer segments;
   allocate the inventory quantity amongst the customer segments according to the ratio for each customer segment to form an inventory quantity for each customer segment;
   for each customer segment, determine a promotion portion of the price schedule that maximizes the objective function by the external optimizer, wherein the promotion portion of the price schedule is determined based at least on the set of prices, the inventory quantity for the customer segment, the approximate per-segment demand model, and the approximate objective function;

aggregate a quantity of remaining inventory allocated to the plurality of customer segments at an end of a date range;

determine a markdown portion of the price schedule for the item that maximizes the objective function by the external optimizer, wherein the markdown portion of the price schedule is determined based at least on the set of prices, the aggregated quantity of remaining inventory, an approximate aggregate demand model for the item, and the approximate objective function;

combine the promotion portion and the markdown portion to create the price schedule for the item; and transmit the price schedule for the item over a network to a computing device of a retailer to control assignment of prices for the item according to the price schedule.

8. The non-transitory computer-readable medium of claim 7, wherein the instructions that when executed by at least the processor cause the computer to transmit the price schedule over the network to a computing device of a retailer cause the computing device of the retailer to modify prices of the item in a pricing database according to the price schedule.

9. The non-transitory computer-readable medium of claim 7, further comprising instructions that when executed by at least the processor cause the computer to:

for each time period in a set of time periods for the promotion portion,
(i) calculate a set of customer segment demands for the item when the item is priced at respective prices in the set of prices,
(ii) calculate a plurality of lines corresponding to a piecewise linear approximation of the set of customer segment demands, and
(iii) for each price in the set of prices, selecting a line that corresponds to a highest demand at the price;
wherein the approximate per-segment demand model for the price during the time period is an equation for the selected line for the price during the time period.

10. The non-transitory computer-readable medium of claim 7, further comprising instructions that when executed by at least the processor cause the computer to:

for each time period in a set of time periods for the markdown portion,
(i) for each customer segment, calculate a set of customer segment demands for the item when the item is priced at respective prices in the set of prices,
(ii) calculate a set of respective aggregate demands by aggregating respective customer segment demands for each price,
(iii) calculate a plurality of lines corresponding to a piecewise linear approximation of the set of aggregate demands, and
(iv) for each price, select a line that corresponds to a highest demand at the price,
wherein the approximate aggregate demand model for the price during the time period is an equation for the selected line.

11. The non-transitory computer-readable medium of claim 7, further comprising instructions that when executed by at least the processor cause the computer to:

for each time period in a set of time periods,
(i) calculate sales for the item at prices in the set of prices, and
(ii) divide the objective function into the plurality of segments based at least on the calculated sales; and for each segment of the objective function, determine a linear envelope that covers the segment;

wherein the description by the approximate objective function of the linear envelopes describes the linear envelope for each segment of the objective function.

12. The non-transitory computer-readable medium of claim 7, wherein the external optimizer is a mixed integer linear programming solver, further comprising providing one or more approximation constraints to the external optimizer to reduce the complexity of generating the price schedule to a feasible level for the mixed integer linear programming solver.

13. The non-transitory computer-readable medium of claim 7, further comprising instructions that when executed by at least the processor cause the computer to submit an additional constraint to the external optimizer during one or more of the determination of the per-segment value, the determination of the promotion portion, and the determination of the markdown portion, wherein the additional constraint is selected from the group consisting of a self no-touch constraint, a cross no-touch constraint, a must-promote set of items constraint, a cannot-promote set of items constraint, and an inter-item constraint.

14. A computing system, comprising:
a processor;
a memory operably connected to the processor;
a non-transitory computer-readable medium operably connected to the processor and memory and storing computer-executable instructions that when executed by at least the processor cause the computing system to:
receive an objective function by the computing system;
divide the objective function into a plurality of segments;
determine an approximate objective function that describes linear envelopes for the plurality of segments of the objective function;
for each customer segment of a plurality of customer segments,
(i) determine a per-segment value of an approximate objective function for the customer segment by an external optimizer, wherein the per-segment value is determined based at least on an inventory quantity of an item, a set of prices for the item, an approximate per-segment demand model, and an approximate objective function transmitted to the external optimizer, and
(ii) compute a ratio of the per-segment value to a sum of all per-segment values for the customer segments;
allocate the inventory quantity amongst the customer segments according to the ratio for each customer segment to form an inventory quantity for each customer segment;
for each customer segment, determine a promotion portion of the price schedule that maximizes the objective function by the external optimizer, wherein the promotion portion of the price schedule is determined based at least on the set of prices, the inventory quantity for the customer segment, the approximate per-segment demand model, and the approximate objective function;
aggregate a quantity of remaining inventory allocated to the plurality of customer segments at an end of a date range;
determine a markdown portion of the price schedule for the item that maximizes the objective function by the external optimizer, wherein the markdown portion of the price schedule is determined based at least on the set of prices, the aggregated quantity of remaining inventory, an approximate aggregate demand model for the item, and the approximate objective function; combine the promotion portion and the markdown portion to create the price schedule for the item; and transmit the price schedule for the item over a network to a computing device of a retailer to control assignment of prices for the item according to the price schedule.

15. The computing system of claim 14, wherein the instructions of the non-transitory computer-readable medium to transmit the price schedule for the item over a network to a computing device of a retailer when executed by at least the processor cause the computing device of the retailer to modify prices of the item in a pricing database according to the price schedule.

16. The computing system of claim 14, wherein the non-transitory computer-readable medium further comprises instructions that when executed by at least the processor cause the computing system to:
for each time period in a set of time periods for the promotion portion,
(i) calculate a set of customer segment demands for the item when the item is priced at respective prices in the set of prices,
(ii) calculate a plurality of lines corresponding to a piecewise linear approximation of the set of customer segment demands, and
(iii) for each price in the set of prices, selecting a line that corresponds to a highest demand at the price;
wherein the approximate per-segment demand model for the price during the time period is an equation for the selected line for the price during the time period.

17. The computing system of claim 14, wherein the non-transitory computer-readable medium further comprises instructions that when executed by at least the processor cause the computing system to:
for each time period in a set of time periods for the markdown portion,
(i) for each customer segment, calculate a set of customer segment demands for the item when the item is priced at respective prices in the set of prices,
(ii) calculate a set of respective aggregate demands by aggregating respective customer segment demands for each price,
(iii) calculate a plurality of lines corresponding to a piecewise linear approximation of the set of aggregate demands, and
(iv) for each price, select a line that corresponds to a highest demand at the price, wherein the approximate aggregate demand model for the price during the time period is an equation for the selected line.

18. The computing system of claim 14, wherein the non-transitory computer-readable medium further comprises instructions that when executed by at least the processor cause the computing system to:
for each time period in a set of time periods, calculate sales for the item at prices in the set of prices, wherein the objective function is divided into the plurality of segments based at least on the calculated sales; and
for each segment of the objective function, determine a linear envelope that covers the segment;
wherein the description by the approximate objective function of the linear envelopes describes the linear envelope for each segment of the objective function.

19. The computing system of claim 14, wherein the external optimizer is a mixed integer linear programming solver, further comprising providing one or more approximation constraints to the external optimizer to reduce the complexity of generating the price schedule to a feasible level for the mixed integer linear programming solver.

* * * * *

UNITED STATES PATENT AND TRADEMARK OFFICE
CERTIFICATE OF CORRECTION

PATENT NO. : 11,423,344 B2
APPLICATION NO. : 16/724725
DATED : August 23, 2022
INVENTOR(S) : Kannan et al.

It is certified that error appears in the above-identified patent and that said Letters Patent is hereby corrected as shown below:

In the Drawings

On sheet 5 of 7, in FIG. 2D, Line 21, delete "Funtion" and insert -- Function --, therefor.

In the Specification

In Column 7, Line 35, delete "$\beta_i^{t,seg}$," and insert -- $\hat{\beta}_i^{t,seg}$, --, therefor.

In Column 7, Line 65, delete "$p_i^{t,seg} + \bar{c}_i^{t,seg} p_i^{t,seg} + \hat{c}_i^{t,seg})$" and insert -- $p_i^{t,seg} + \bar{c}_i^{t,seg}, \hat{m}_i^{t,seg} p_i^{t,seg} + \hat{c}_i^{t,seg})$ --, therefor.

In Column 7, Line 65, delete "EQ. 2" and insert -- EQ 2 --, therefor.

In Column 8, Line 5, delete "$\bar{c}_t^{t,seg}$" and insert -- $\bar{c}_i^{t,seg}$ --, therefor.

In Column 8, Line 5, delete "$\hat{c}_i^{seg}$" and insert -- $\hat{c}_i^{t,seg}$ --, therefor.

In Column 9, Line 28, delete "$I_t^{t,seg}$" and insert -- $I_i^{t,seg}$ --, therefor.

In Column 9, Line 57, delete "$\mathbb{T}_c$" and insert -- $\mathbb{T}_C$ --, therefor.

In Column 10, Line 31, delete "∀$i$∈$\mathbb{P}$" and insert -- ∀$i \in \mathbb{P}$, --, therefor.

Signed and Sealed this
Fourteenth Day of March, 2023

Katherine Kelly Vidal
*Director of the United States Patent and Trademark Office*

In Column 11, Line 6, delete "$\mathbb{T}c.$" and insert -- $\mathbb{T}_C.$ --, therefor.

In Column 11, Line 6, delete "$T_c$" and insert -- $T_C$ --, therefor.

In Column 11, Line 26, delete "10" and insert -- 210 --, therefor.

In Column 17, Line 13, delete "U.S.C" and insert -- U.S.C. --, therefor.

In Column 17, Line 63, delete "U.S.C" and insert -- U.S.C. --, therefor.